United States Patent
Watanabe et al.

(10) Patent No.: US 9,364,883 B2
(45) Date of Patent: Jun. 14, 2016

(54) METHOD OF PRODUCING A SEPARATOR

(75) Inventors: Takuma Watanabe, Anjo (JP); Kohei Ushida, Toyota (JP); Shirou Fujimura, Miyoshi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 515 days.

(21) Appl. No.: 13/209,556

(22) Filed: Aug. 15, 2011

(65) Prior Publication Data

US 2012/0055223 A1    Mar. 8, 2012

(30) Foreign Application Priority Data

Sep. 2, 2010 (JP) ................................ 2010-197086

(51) Int. Cl.
| | |
|---|---|
| B21D 22/21 | (2006.01) |
| B21D 13/02 | (2006.01) |
| H01M 8/02 | (2016.01) |
| H01M 8/0254 | (2016.01) |
| H01M 8/0206 | (2016.01) |

(52) U.S. Cl.
CPC ............... *B21D 22/21* (2013.01); *B21D 13/02* (2013.01); *H01M 8/0206* (2013.01); *H01M 8/0254* (2013.01); *Y02E 60/50* (2013.01); *Y02P 70/56* (2015.11)

(58) Field of Classification Search
CPC ...... B21D 22/30; B21D 11/085; B21D 13/04; B21D 13/02; B21D 22/21; B21D 13/045; B21D 53/022; B21D 53/04; H01R 43/058; B21J 13/02; H01M 8/0206; H01M 8/0254; Y02E 60/50

USPC ........ 72/347, 348, 412, 470, 474, 475, 379.6, 72/385

See application file for complete search history.

(56) References Cited

U.S. PATENT DOCUMENTS

| | | | | |
|---|---|---|---|---|
| RE28,511 | E | * | 8/1975 | Avitzur ........................... 72/347 |
| 4,250,728 | A | * | 2/1981 | King ................................ 72/177 |
| 5,105,645 | A | * | 4/1992 | Kobayashi et al. ............. 72/348 |
| 5,544,517 | A | * | 8/1996 | Shimizu .......................... 72/349 |
| 5,778,722 | A | * | 7/1998 | Saiki et al. ...................... 72/347 |
| 6,138,354 | A | * | 10/2000 | Kobayashi et al. ...... 29/890.049 |
| 6,347,454 | B1 | * | 2/2002 | Jurica et al. ................... 29/897.2 |
| 6,568,064 | B2 | * | 5/2003 | Kanno et al. .................... 29/596 |
| 7,117,708 | B2 | * | 10/2006 | Yamano et al. .................. 72/350 |

(Continued)

FOREIGN PATENT DOCUMENTS

| | | |
|---|---|---|
| JP | 2000-317531 | 11/2000 |
| JP | 2010-005651 | 1/2010 |
| JP | 2010-167441 | 8/2010 |

OTHER PUBLICATIONS

Chinese Office action, dated Aug. 15, 2013 along with an english translation thereof.

(Continued)

*Primary Examiner* — David Bryant
*Assistant Examiner* — Lawrence Averick
(74) *Attorney, Agent, or Firm* — Greenblum & Bernstein, P.L.C.

(57) ABSTRACT

This method is for producing a compact (fuel-cell separator) having a projection by pressing a plate by a die and a punch. A tip end surface of the punch presses the plate to form an overhang, and then a sidewall of the overhang is sandwiched between an inclined surface of the die and an inclined surface of the punch, and in this state the sidewall is rolled, thereby forming the projection.

6 Claims, 7 Drawing Sheets

(56) References Cited

U.S. PATENT DOCUMENTS

| | | | |
|---|---|---|---|
| 7,171,838 B2* | 2/2007 | Shiokawa | 72/356 |
| 7,178,374 B2* | 2/2007 | Enjoji et al. | 72/312 |
| 2006/0121330 A1* | 6/2006 | Reijerse et al. | 429/38 |
| 2009/0113976 A1* | 5/2009 | Tomaru et al. | 72/347 |
| 2009/0274957 A1* | 11/2009 | Goda et al. | 429/164 |
| 2010/0064759 A1 | 3/2010 | Kondo et al. | |
| 2010/0095517 A1* | 4/2010 | Yang et al. | 29/623.1 |
| 2011/0123904 A1 | 5/2011 | Fujimura et al. | |

OTHER PUBLICATIONS

Japanese Office action dated Feb. 12, 2014, along with an English-language translation thereof.

Chinese Office action dated Mar. 12, 2014, along with an English-language translation thereof.

Official Action, along with English-language translation thereof, for German Application No. 10 2011 082 003.5 dated Feb. 25, 2016.

* cited by examiner

METHOD OF PRODUCING A SEPARATOR

CROSS-REFERENCE TO RELATED APPLICATIONS

The present application claims priority under 35 U.S.C. §119 of Japanese Application No. 2010-197086 filed on Sep. 2, 2010, the disclosure of which is expressly incorporated by reference herein in its entirety.

BACKGROUND OF THE INVENTION

1. Field of the Invention

The present invention relates to a producing method of a compact, and more particularly, to a producing method of a compact which is formed by being pressed by a punch, the producing method being capable of efficiently and reliably obtaining the compact having a projection which has a sufficient height with respect to its opening width and which has a large tip end side area.

2. Description of Related Art

As a fuel-cell separator, there is conventionally known a gas flow passage on which a plurality of minute projections are provided and through which gas such as hydrogen and oxygen is made to flow. As a producing method of the fuel-cell separator, there is generally known a method of pressing a metal plate by a die and a punch to form a plurality of projections (see Japanese Patent Application Laid-Open No. 2000-317531, for example). It is disclosed in this patent document that a plate 105 is formed into an overhang 120 by a first press die 106 as shown in FIG. 12A and then, a second press die 107 presses an inner side of a peripheral edge of the overhang 120 to form a projection 103 as shown in FIGS. 12B and 12C. According to this, material effectively moves at a projection-forming portion, and this prevents a crack which may be caused due to reduction in plate thickness.

According to the technique of the patent document, however, in order to form the projection 103, it is necessary to carry out two press working operations using at least two press dies 106 and 107, which is nonproductive.

Here, in the case of the fuel-cell separator, if a height of the projection is sufficiently increased with respect to its opening width, a gas flow passage can be made large, and if a tip end side area of the projection is increased, power collection efficiency can be enhanced. According to the technique of the patent document, however, since any of the press working operations using the press dies 106 and 107 is stretch forming, the plate 105 is pulled between two points, i.e., a base end edge 108a of the die 108 and a tip end edge 109a of the punch 109, and extended as shown in FIG. 12B; therefore, the plate 105 cannot be extended beyond coefficient of extension of its material. Hence, the height of the projection 103 cannot sufficiently be increased with respect to the opening width, and it becomes difficult to increase the gas flow passage in size. By contrast, if the tip end side area of the projection 103 is made relatively narrow, it is possible to increase the height of the projection 103 and to increase the gas flow passage in size, but it becomes difficult to enhance the power collection efficiency. Even for production of not only the above-described fuel-cell separator but also an automobile part, a home electrical appliance part, or the like in which a projection is formed by pressing a plate is to be produced, it is desired that the projection has a sufficient height with respect to the opening width and has a large tip end side area.

SUMMARY OF THE INVENTION

The present invention has been accomplished in view of the above-described circumstances, and it is an object of the invention to provide a producing method of a compact which is formed by being pressed by a punch, the producing method being capable of efficiently and reliably obtaining the compact having a projection which has a sufficient height with respect to its opening width and which has a large tip end side area.

One aspect of the present embodiments provides a producing method for producing a compact having a projection by pressing a plate by a die and a punch, wherein a tip end surface of the punch presses the plate to form an overhang, and then a sidewall of the overhang is sandwiched between an inclined surface of the die and an inclined surface of the punch, and in this state the sidewall is rolled, thereby forming the projection.

In a further aspect, an inclination angle ($\theta 1$) of the inclined surface of the die is 15 to 25°, and an inclination angle ($\theta 2$) of the inclined surface of the punch is 15 to 25°.

In a further aspect, a ratio (s/t) between a distance (s) from the inclined surface of the die to the inclined surface of the punch in a state where the die and the punch are closed and a plate thickness (t) of the plate is 0.2 to 0.8.

In a further aspect, the die and the punch roll the sidewall of the overhang in a state where the die and the punch are separated from a bottom wall of the overhang.

According to the producing method of a compact of the present embodiments, the tip end surface of the punch presses the plate to faun the overhang, and then the sidewall of the overhang is sandwiched between the inclined surface of the die and the inclined surface of the punch, and in this state the sidewall is rolled to form the projection, thereby obtaining the compact having the projection. In this manner, the overhang is formed by the stretch forming by one press working operation and then the sidewall of the overhang is rolled to form the projection. Therefore, a material effectively moves by rolling the sidewall of the overhang. As a result, it is possible to efficiently and reliably obtain a compact having a projection which has a sufficient height with respect to its opening width and which has a large tip end side area while suppressing a tear of the projection.

If the inclination angle ($\theta 1$) of the inclined surface of the die is 15 to 25° and the inclination angle ($\theta 2$) of the inclined surface of the punch is 15 to 25°, a material more effectively moves by rolling the sidewall of the overhang, and it is possible to further increase the height and the tip end side area of the projection while more reliably suppressing a tear or the like. Further, a pressing force of the press working is not excessively increased, and it is possible to suppress a force applied to the die and the punch, and to prevent the die and the punch from being, for example, deformed and damaged.

Further, if the ratio (s/t) between the distance (s) from the inclined surface of the die to the inclined surface of the punch in a state where the die and the punch are closed and the plate thickness (t) of the plate before press working is 0.2 to 0.8, a material more effectively moves by rolling the sidewall of the overhang and it is possible to further increase the height and the tip end side area of the projection while more reliably suppressing a tear or the like. Further, the pressing force of the press working is not excessively increased, and it is possible to suppress a force applied to the die and the punch, and it is possible to prevent the die and the punch from being, for example, deformed and damaged.

Further, if the die and the punch roll the sidewall of the overhang in a state where the die and the punch are separated from a bottom wall of the overhang, a material more effectively moves toward the bottom wall of the overhang by rolling the sidewall of the overhang, and it is possible to more reliably suppress a tear or the like, and to further increase the height and the tip end side area of the projection.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

Figure 1:
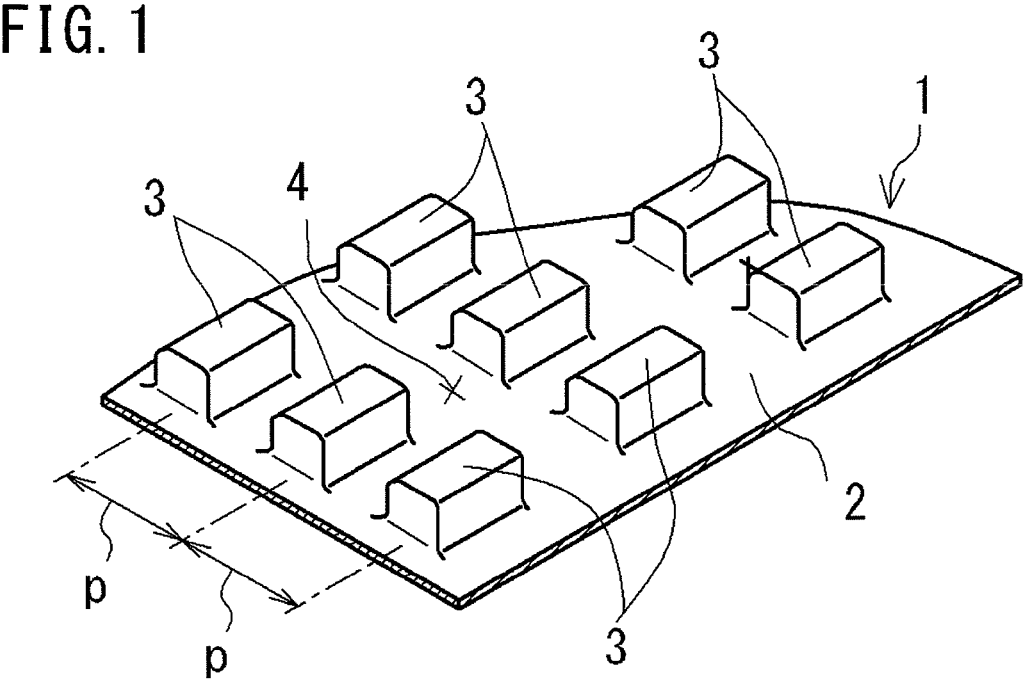
FIG. 1 is a schematic perspective view of an essential portion of a fuel-cell separator of an example embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the producing method of a compact according to a embodiment, a plate is pressed by a die and a punch to produce a compact having projections. The producing method is characterized in that a plate (5) is pressed by a tip end surface (11c) of a punch (9) to form an overhang (20), and thereafter a sidewall (20a) of the overhang is sandwiched between an inclined surface (10b) of the die (8) and an inclined surface (11b) of the punch (9), and in this state the sidewall (20a) is rolled to faun a projection (3) (see FIGS. 4, 5 and the like, for example). Generally, the plate is made of metal.

Figure 3:
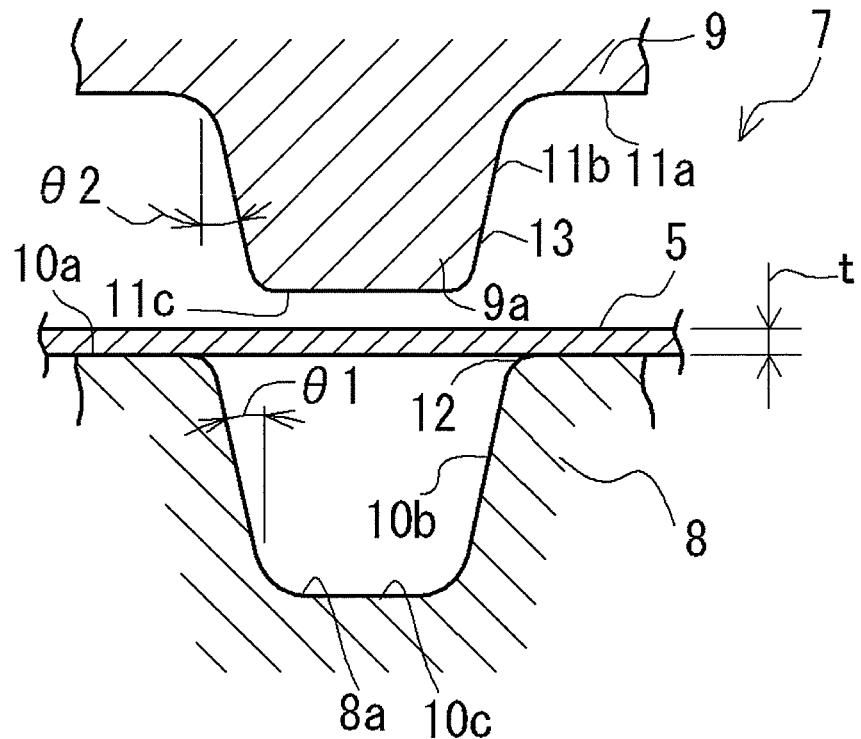
FIG. 3 is an enlarged view of an essential portion in FIG. 2.

The producing method of a compact according to the embodiment may include a form, for example, in which an inclination angle (θ1) of the inclined surface (10b) of the die is 15 to 25°, and an inclination angle (θ2) of the inclined surface (11b) of the punch is 15 to 25° (see FIG. 3 and the like, for example). In this case, the inclination angle (θ1) and the inclination angle (θ2) can be substantially equal to each other. The "inclination angle (θ1)" and the "inclination angle (θ2)" are angles between the die and a sliding direction of the punch.

Figure 6:
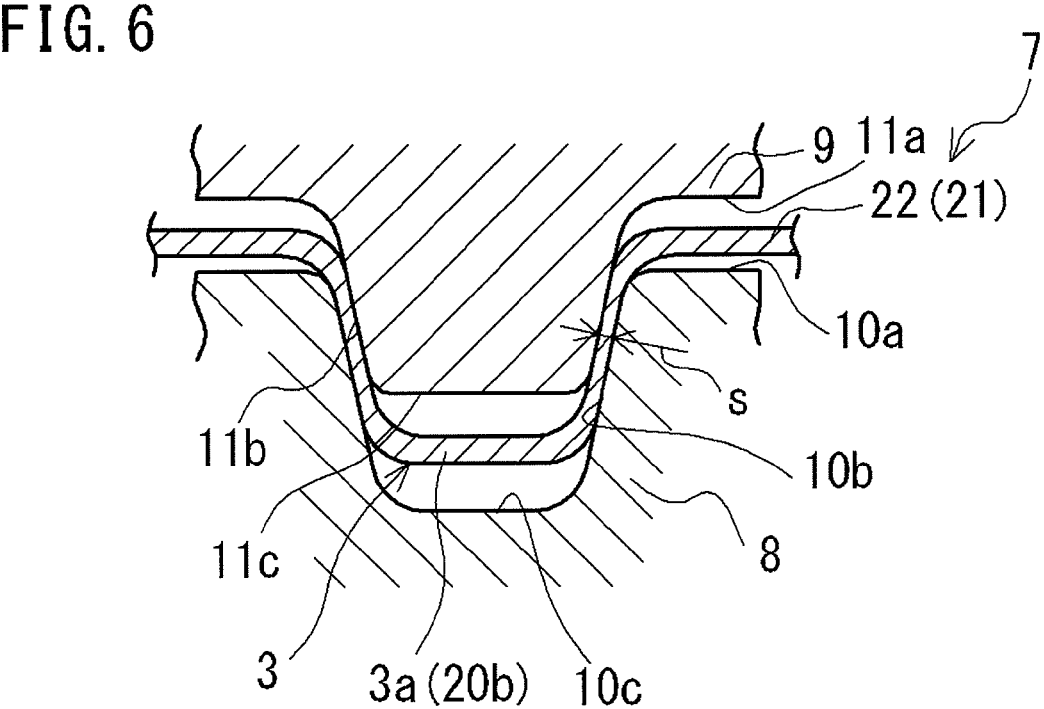
FIG. 6 is a vertical sectional view showing a state after the die and the punch of the first press die are closed.

The producing method of a compact according to the embodiment may include a form, for example, in which a ratio (s/t) between a distance (s) from the inclined surface of the die to the inclined surface of the punch in a state where the die and the punch are closed and a plate thickness (t) of the plate before pressing is 0.2 to 0.8 (see FIGS. 3, 6 and the like, for example). The distance (s) can be 0.02 to 0.16 mm. The plate thickness (t) of the plate can be 0.1 to 0.2 mm, for example. The "distance (s)" is a minimum distance between the inclined surface of the die and the inclined surface of the punch in a state where the die and the punch are closed.

Figure 4:
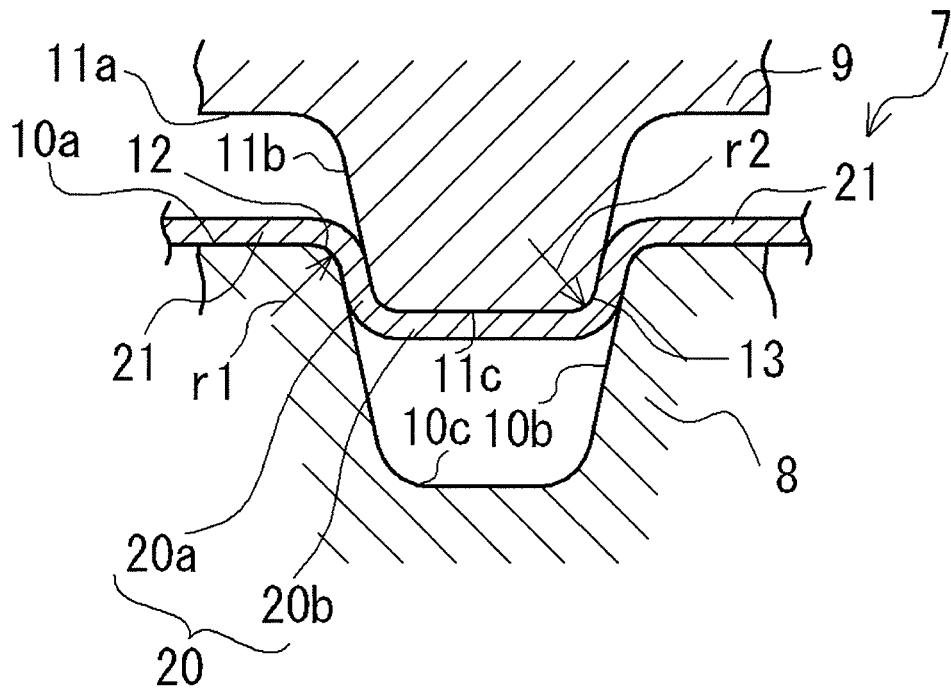
FIG. 4 is an explanatory diagram for explaining stretch forming by means of the first press die, and is also a vertical sectional view showing a halfway state between a state where the die and the punch are opened and a state where they are closed.

The producing method of a compact according to the embodiment may include a form, for example, in which a radius (r1) of an arc surface (12) which connects a base end surface and the inclined surface of the die is 0.05 to 0.3 mm, and a radius (r2) of an arc-surface (13) which connects a tip end surface and the inclined surface of the punch is 0.05 to 0.3 mm (see FIG. 4 and the like, for example). According to this, a length (area) of a portion between a bottom wall of one overhang and another overhang adjacent to the bottom wall can be increased, and it is possible to more reliably suppress a tear or the like of the projection.

Figure 5:
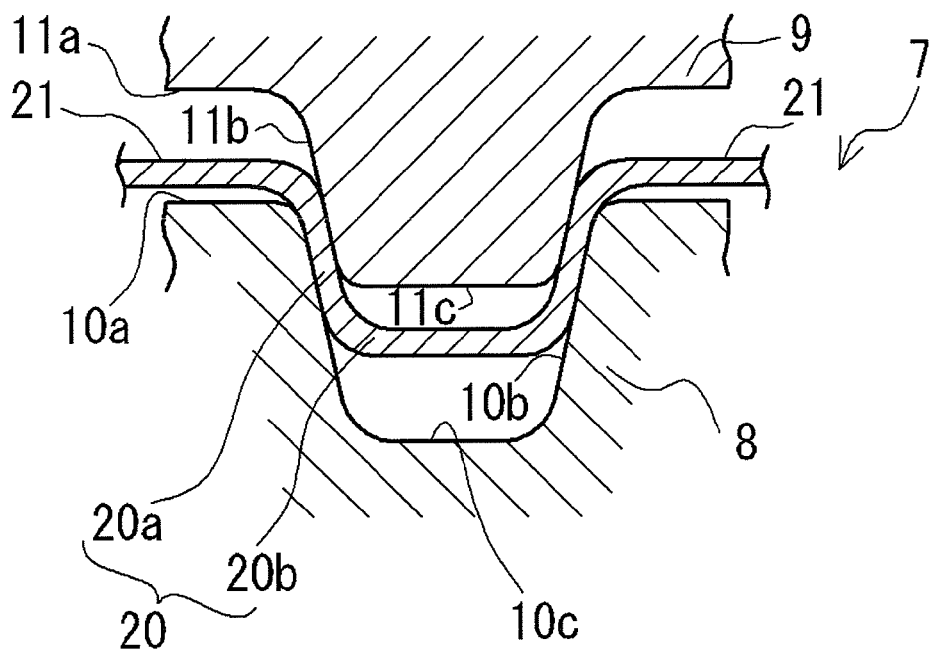
FIG. 5 is a vertical sectional view showing a state immediately before the die and the punch of the first press die are closed.

The producing method of a compact according to the embodiment may include a form, for example, in which the sidewall (20a) of the overhang is rolled in a state where the die and the punch are separated away from the bottom wall (20b) of the overhang (see FIG. 5 and the like, for example). According to this, a material more effectively moves toward the bottom wall of the overhang by rolling the sidewall of the overhang, and it is possible to more reliably suppress a tear or the like, and to further increase the height and the tip end side area of the projection. In this case, it is preferable that the sidewall of the overhang is rolled in a state where the die and the punch are separated away from a portion (21) between adjacent overhangs. This is because that in addition to the movement of a material toward the sidewall of the overhang, the material more effectively moves toward the portion between the adjacent overhangs.

Figure 7:
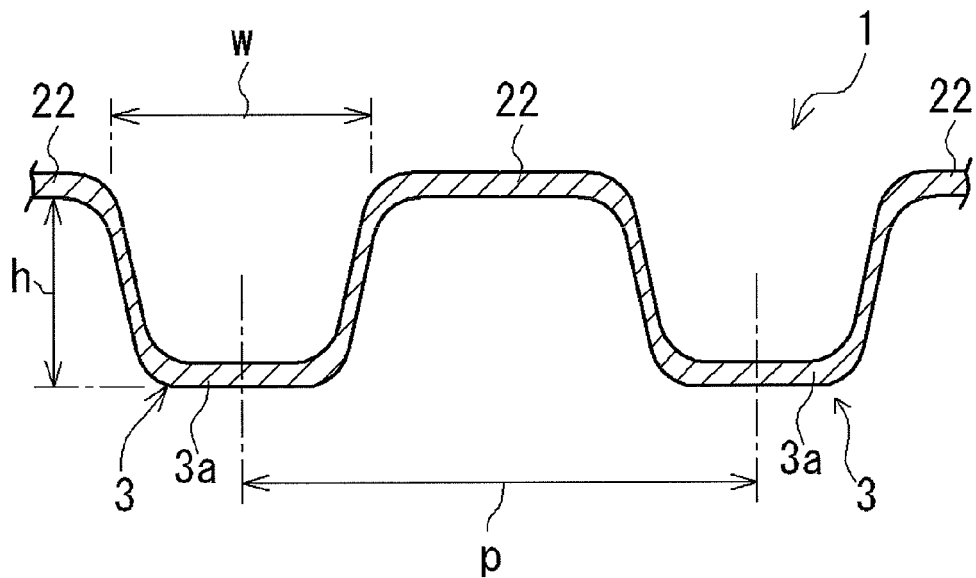
FIG. 7 is a vertical sectional view of a halfway completed fuel-cell separator formed by the first press die.

Intended uses of the "compact" are not especially limited. The compact is utilized as a fuel-cell separator, for example. Usually, a large number of minute projections are provided within a constant area of the fuel-cell separator, and the fuel-cell separator is utilized as a gas flow passage. A ratio (h/w) between a height (h) and an opening width (w) of the projection can be 0.4 to 0.8 (see FIG. 7 and the like for example). Materials, size, or the like of the "plate" are not especially limited. Examples of the materials of the plate are titanium, titanium alloy and stainless steel.

EXAMPLE

The present invention will be described specifically using the drawings based on example of embodiment. In this example embodiment, a fuel-cell separator is described as the "compact" of the present invention.

(1) Configuration of Fuel-Cell Separator

As shown in FIG. 1, a fuel-cell separator 1 according to the example embodiment includes a flat main body 2 and a plurality of projections 3 which are arranged at a predetermined pitch distance p from one another in a flat direction of the main body 2 and which form a gas flow passage 4. The fuel-cell separator 1 is obtained by press working a plate 5 by a first press die and a second press die which are described later. The plate 5 is made of metal (e.g., titanium alloy or the like).

(2) Configuration of First Press Die

Figure 2:
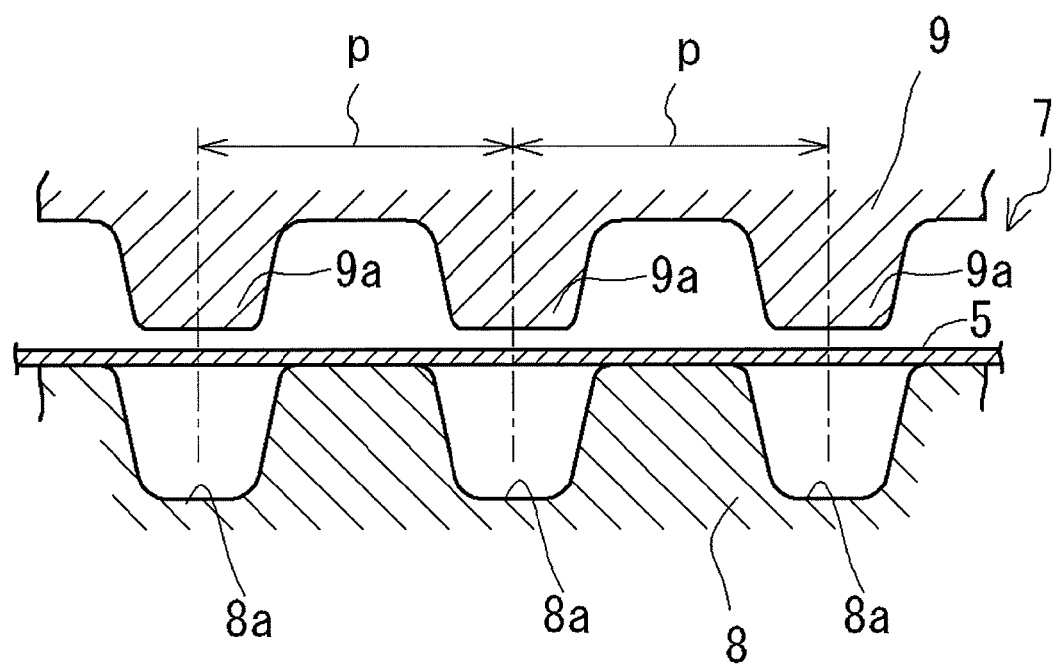
FIG. 2 is a vertical sectional view showing a state where a die and a punch of a first press die of the example embodiment are opened.

As shown in FIGS. 2 and 3, a first press die 7 of the example embodiment includes a die 8 having a plurality of concave portions 8a, and a punch 9 which can move toward and away from the die 8 and which includes a plurality of convex portions 9a. The die 8 includes a flat base end surface 10a, an inclined surface 10b which is connected to the base end surface 10a and which forms an inner peripheral surface of the concave portion 8a, and a flat bottom end surface 10c which is connected to a bottom surface of the inclined surface 10b and which forms a base end surface of the concave portion 8a. An inclination angle $\theta1$ between the inclined surface 10b and a sliding direction of the punch 9 is about 20°. The punch 9 includes a flat base end surface 11a, an inclined surface 11b which is connected to the base end surface 11a and which forms an outer peripheral surface of the convex portion 9a, and a flat tip end surface 11c which is connected to a tip end of the inclined surface 11b and which forms a tip end surface of the convex portion 9a. An inclination angle $\theta2$ between the inclined surface 11b and the sliding direction of the punch 9 is about 20°.

As shown in FIG. 4, a radius r1 of an arc surface 12 which connects a base end surface 10a and an inclined surface 10b of the die 8 is about 0.1 mm. A radius r2 of an arc surface 13 which connects a tip end surface 11c and an inclined surface 11b of the punch 9 is about 0.1 mm. As shown in FIG. 6, a ratio (s/t) between a distance s from the inclined surface 10b of the die 8 to the inclined surface 11b of the punch 9 and the plate thickness t of the plate is about 0.3.

(3) Configuration of Second Press Die

Figure 8:
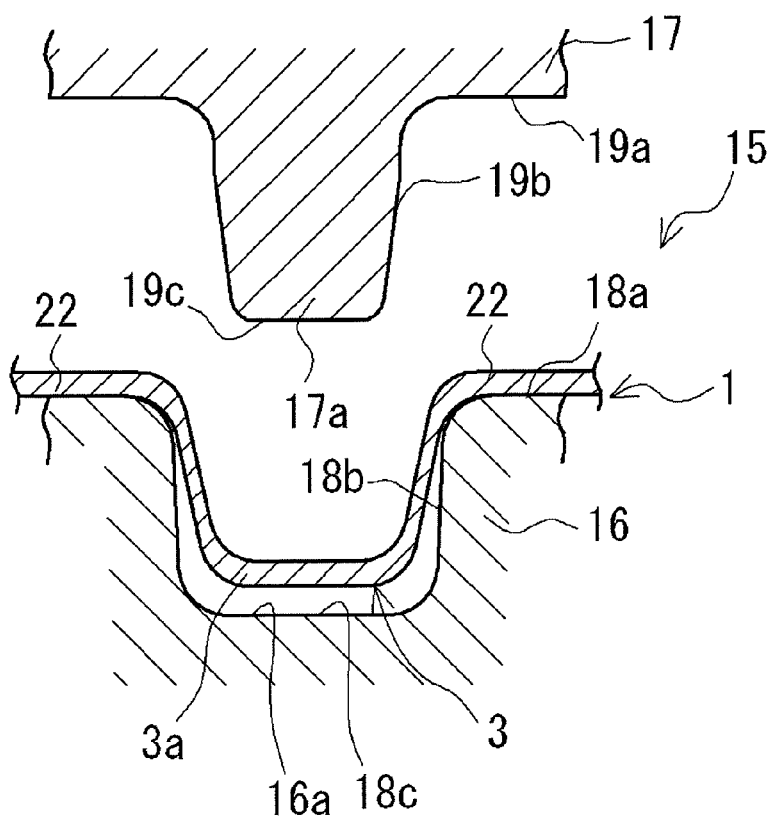
FIG. 8 is a vertical sectional view showing a state where a die and a punch of a second press die of the example embodiment are opened.
Figure 9:
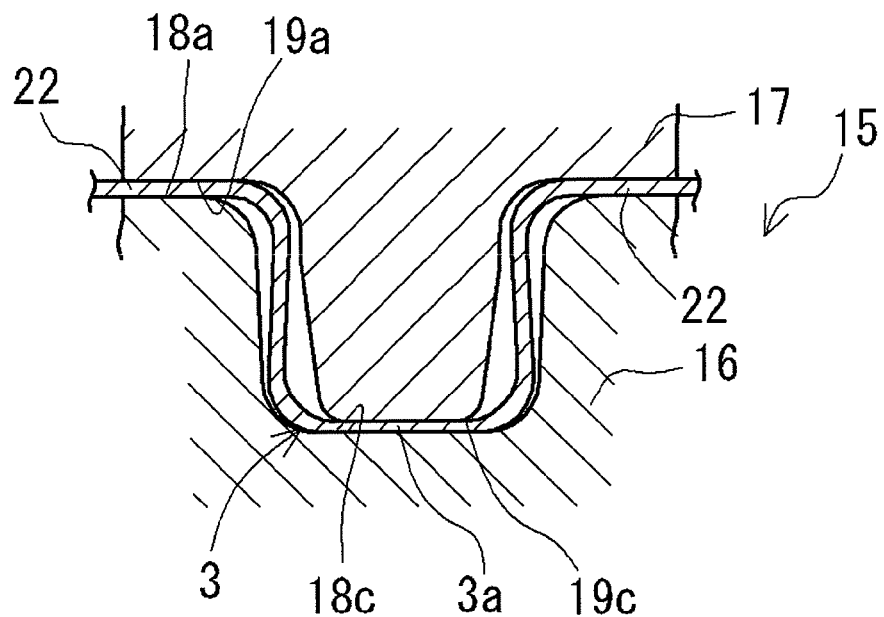
FIG. 9 is a vertical sectional view showing a state where the die and the punch of the second press die are closed.
Figure 10:
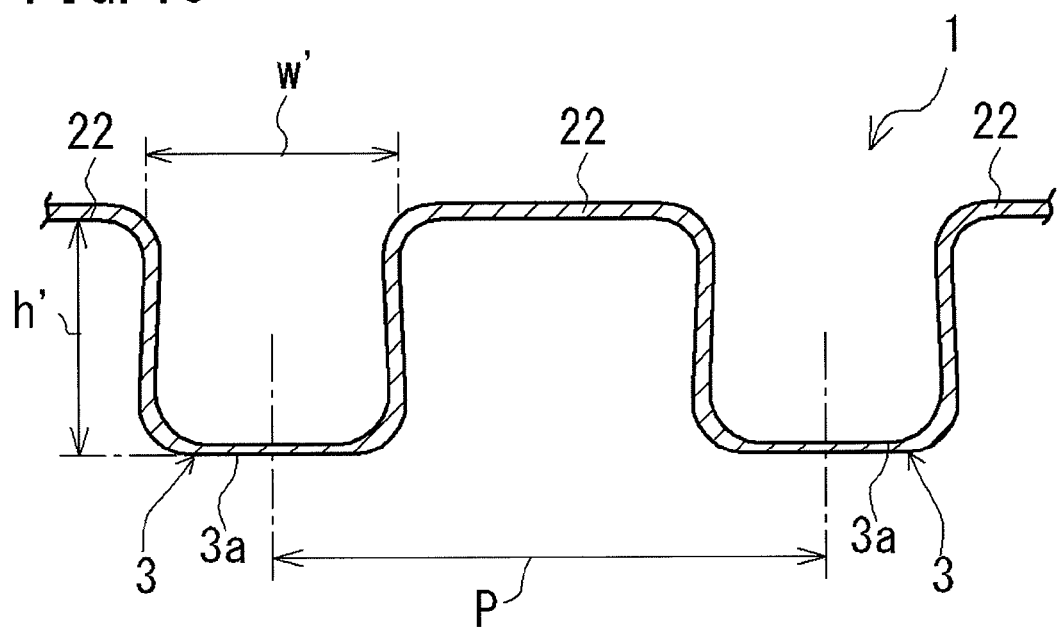
FIG. 10 is a vertical sectional view of a completed fuel-cell separator formed by the second press die.

As shown in FIGS. 8 and 9, a second press die 15 according to the example embodiment includes a die 16 having a plurality of concave portions 16a, and a punch 17 which can move toward and away from the die 16 and which has a plurality of convex portions 17a. The die 16 includes a flat base end surface 18a, an inner peripheral surface 18b which is connected to the base end surface 18a and which forms an inner peripheral surface of the concave portion 16a, a flat bottom end surface 18c which is connected to a bottom surface of the inner peripheral surface 18b and which forms a base end surface of the concave portion 16a. The punch 17 includes a flat base end surface 19a, an outer peripheral surface 19b which is connected to the base end surface 19a and which foams an outer peripheral surface of the convex portion 17a, and a flat tip end surface 19c which is connected to a tip end of the outer peripheral surface 19b and which forms a tip end surface of the convex portion 17a.

(4) Producing Method of Fuel-Cell Separator

Next, a producing method of a fuel-cell separator using the first and second press dies 7 and 15 having the above-described configuration will be described. First, the plate 5 is set between the die 8 and the punch 9 of the first press die 7 in a state where the die and the punch are opened as shown in FIG. 3. Next, if the punch 9 is made to approach the die 8 as shown in FIG. 4, the plate 5 is pressed by the tip end surface 11c of the punch 9 and the overhang 20 is formed in the concave portion 8a of the die 8. The overhang 20 includes a flat bottom wall 20b and a sidewall 20a which rises from a peripheral edge of the bottom wall 20b.

Next, if the punch 9 is made to further approach the die 8 as shown in FIG. 5, the sidewall 20a of the overhang 20 is sandwiched between the inclined surface 10b of the die 8 and the inclined surface 11b of the punch 9, and in this state the sidewall 20a is squeezed and the projection 3 (see FIG. 6) is formed, and a halfway completed fuel-cell separator 1 is obtained. When the projection 3 is to be formed, substantially simultaneously with or immediately after the start of rolling the sidewall 20a of the overhang 20, the sidewall 20a of the overhang 20 is squeezed in a state where the bottom end surface 10c of the die 8 and the tip end surface 11c of the punch 9 separate from the bottom wall 20b of the overhang 20 and the base end surface 10a of the die 8 and the base end surface 11a of the punch 9 separate from the portion 21 between adjacent overhangs 20, and these separated states are maintained until the die and the punch are closed.

Next, the above-described halfway completed fuel-cell separator 1 is set between the die 16 and the punch 17 of the opened second press die 15 as shown in FIG. 8. Next, if the punch 17 is made to approach the die 16 as shown in FIG. 9, a bottom wall 3a of the projection 3 is rolled between the bottom end surface 18c of the die 16 and the tip end surface 19c of the punch 17, a portion 22 between the adjacent projections 3 is crushed between the base end surface 18a of the die 16 and the base end surface 19a of the punch 17, and a completed fuel-cell separator 1 is obtained.

(5) Concerning Experiment Examples and Comparative Examples

Experiment examples 1 and 2 and comparative examples 1 and 2 in which the inclination angle $\theta1$ of the inclined surface of the die 8 and the inclination angle $\theta2$ of the inclined surface of the punch 9 are changed will be described next. In the comparative example 1 in which the inclination angles $\theta1$ and $\theta2$ were set to 12°, it was observed that the sidewall 20a of the overhang 20 was rolled in a state where the tip end surface 11c of the punch 9 was in contact with the bottom wall 20b of the overhang 20 irrespective of a sliding speed of the punch 9, and the projection 3 tore. In the comparative example 2 in which the inclination angles $\theta1$ and $\theta2$ were set to 27°, it was observed that a pressing force did not become excessively strong and the first press die 7 was deformed. On the other hand, in the experiment example 1 in which the inclination angles $\theta1$ and $\theta2$ were set to 15° and in the experiment example 2 in which the inclination angles $\theta1$ and $\theta2$ were set to 25°, a tear of the projection 3 and deformation or the like of the first press die 7 were not observed.

(6) Effect of Example

As described above, according to the producing method of a fuel-cell separator of the example embodiment, the plate 5 is pressed by the tip end surface 11c of the punch 9 and the overhang 20 is formed, and thereafter the sidewall 20a of the overhang 20 is sandwiched between the inclined surface 10b of the die 8 and the inclined surface 11b of the punch 9 and rolled to form the projections 3, thereby obtaining the fuel-cell separator 1 having the plurality of projections 3. As described above, in one press working operation, after the overhang 20 is formed by stretch forming, the sidewall 20a of the overhang 20 is rolled to form the projections 3. Therefore, the material effectively moves by rolling the sidewall 20a of the overhang 20. Therefore, it is possible to efficiently and reliably obtain the fuel-cell separator 1 having the projection 3 which has a sufficient height h with respect to the opening width w and which has a large tip end side area while suppressing a tear or the like of the projection 3. As a result, in the fuel-cell separator 1, the gas flow passage can be increased in size by increasing the height of the projection 3 without being influenced by rate of elongation of a material of the plate 5, and power collection efficiency can be enhanced by increasing the tip end side area of the projection 3.

In this example embodiment, in the first press die 7, the inclination angle θ1 of the inclined surface 10b of the die 8 and the inclination angle θ2 of the inclined surface 11b of the punch 9 are set to about 20°. Therefore, the material more effectively moves by rolling the sidewall 20a of the overhang 20, it is possible to more reliably suppress a tear or the like and to further increase the height h and the tip end side area of the projection 3. The pressing force is not excessively increased, and it is possible to suppress a force applied to the die 8 and the punch 9, and to prevent the die 8 and the punch 9 from being, for example, deformed or damaged.

In this example embodiment, the ratio (s/t) between the distance s from the inclined surface 10b of the die 8 to the inclined surface 11b of the punch 9 in the state where the die and the punch are closed and the plate thickness t of the plate 5 is set to about 0.3. Therefore, the material more effectively moves by rolling the sidewall 20a of the overhang 20, and it is possible to more reliably prevent a tear or the like, and to further increase the height h and the tip end side area of the projection 3. The pressing force is not excessively increased, and it is possible to suppress a force applied to the die 8 and the punch 9, and to prevent the die 8 and the punch 9 from being, for example, deformed or damaged.

In the example embodiment, the radius r1 of the arc surface 12 which connects the base end surface 10a and the inclined surface 10b of the die 8 is set to about 0.1 mm, and the radius r2 of the arc surface 13 which connects the tip end surface 11c and the inclined surface 11b of the punch 9 is set to about 0.1 mm. Therefore, it is possible to increase the length (area) of the portion 21 between the bottom wall 20b of the overhang 20 and adjacent overhangs 20, and to more reliably suppress a tear or the like of the projection 3.

In the example embodiment, the sidewall 20a of the overhang 20 is rolled in a state where the die 8 and the punch 9 do not come into contact with the bottom wall 20b of the overhang 20 and the portion 21 between adjacent overhangs 20. Therefore, when the sidewall 20a of the overhang 20 is to be rolled, a material more effectively moves toward the portion 21 between the sidewall 20a of the overhang 20 and the adjacent overhangs 20; therefore, it is possible to more reliably suppress a tear or the like, and to further increase the height h and the tip end side area of the projection 3.

Further, in the example embodiment, the sidewall 20a of the overhang 20 is rolled using the first press die 7 to form the projections 3, and then the portion 22 between the bottom wall 3a of the projection 3 and adjacent projections 3 is rolled using the second press die 15. Therefore, it is possible to increase the length (area) of the portion 22 between the bottom wall 3a of the projection 3 and the adjacent projections 3.

Figure 11:
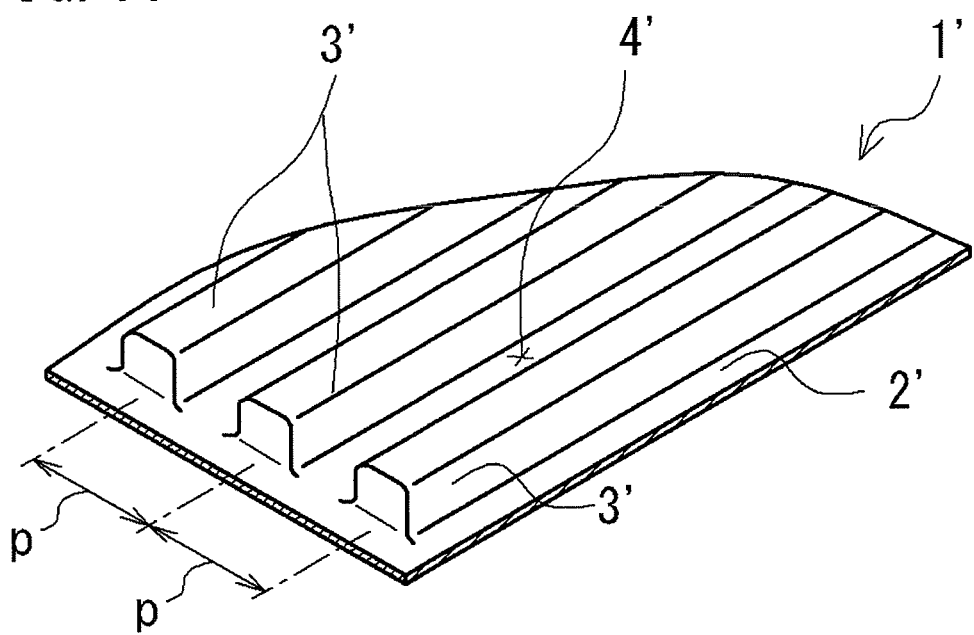
FIG. 11 is a schematic perspective view of an essential portion of a fuel-cell separator of another example embodiment.
Figure 12A:
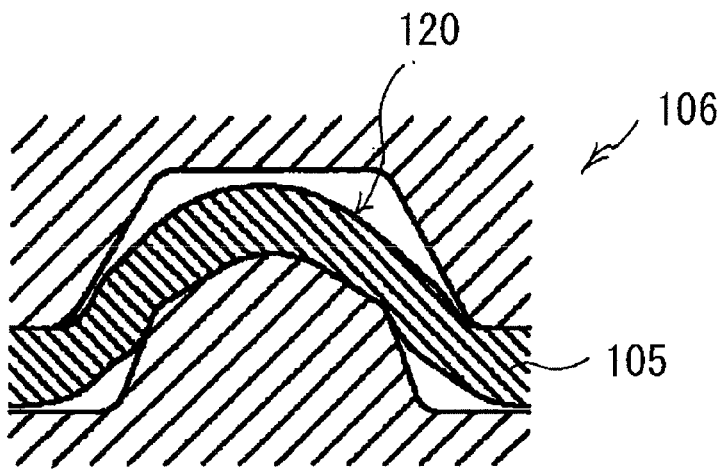
FIG. 12A is an explanatory diagram for explaining a conventional producing method of a fuel-cell separator showing a state where a die and a punch of a first press die are closed.
Figure 12B:
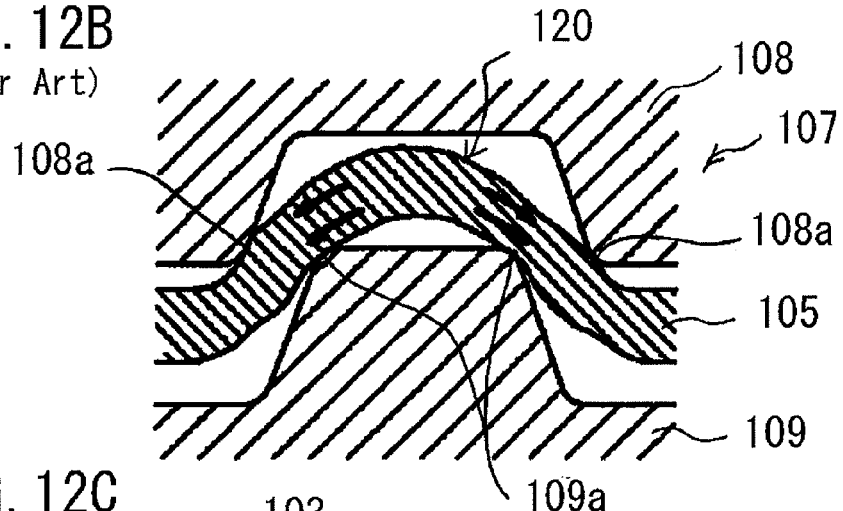
FIG. 12B is an explanatory diagram for explaining a conventional producing method of a fuel-cell separator showing a state where a die and a punch of a second press die are opened.
Figure 12C:
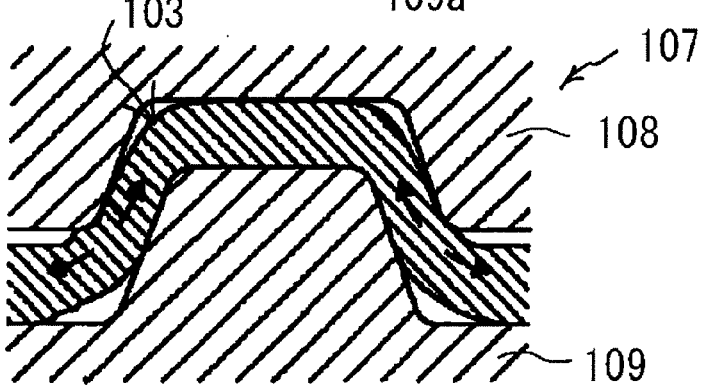
FIG. 12C is an explanatory diagram for explaining a conventional producing method of a fuel-cell separator showing a state where the die and the punch of the second press die of FIG. 12B are closed.

The present invention is not limited to the above-described example embodiment, and the example embodiment can be variously changed within a scope of the invention in accordance with intended purposes or uses. That is, although the plurality of projections 3 are arranged along the flat direction of the main body 2 and the fuel-cell separator 1 forming the gas flow passage 4 is described in the example embodiment, the invention is not limited to this. For example, as shown in FIG. 11, a plurality of long projections 3' can be arranged along one direction of a main body 2' and a fuel-cell separator 1' forming a gas flow passage 4' may be formed.

Although the projection 3 having a polygonal flat surface shape is described in the example embodiment, the invention is not limited to this, and the projection may have a circular or elliptic flat surface shape. Further, projections having different flat surface shapes may be combined.

Although a completed fuel-cell separator 1 is obtained by two press working operations using the first and second press dies 7 and 15 in the example embodiment, the invention is not limited to this. For example, the second press die 15 may be eliminated, and a completed fuel-cell separator may be obtained by one press working operation using the first press die 7. Alternatively, another press die may be added to the first and second press dies 7 and 15, and a fuel-cell separator may be obtained by three or more press working operations.

Although the punch 9 of the first press die 7 has the flat surface tip end in the example embodiment, the invention is not limited to this, and the punch may have a convex tip end, for example. Although the die 8 of the first press die 7 has the flat bottom end in the example embodiment, the invention is not limited to this, and the die may have a concave bottom end, for example.

In the example embodiment, substantially simultaneously with or immediately after the start of rolling the sidewall 20a of the overhang 20, the die 8 and the punch 9 are separated from the bottom wall 20b and the like of the overhang 20. However, the invention is not limited to this, the die 8 and the punch 9 may be separated from the bottom wall 20b and the like of the overhang 20 when predetermined time is elapsed after the start of rolling the sidewall 20a of the overhang 20.

The present invention is widely utilized as a technique for producing a compact having a projection. Especially, the invention is preferably utilized as a technique for producing a fuel-cell separator having a plurality of projections.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A producing method for producing a separator having a projection by pressing a plate by a die and a punch, wherein a tip end surface of the punch presses the plate to form an overhang, and then a sidewall of the overhang is sandwiched between an inclined surface of the die and an inclined surface of the punch, and in this state the sidewall is rolled, thereby forming the projection, the die and the punch roll the sidewall of the overhang in a state where the die and the punch are separated from a bottom wall of the overhang, an inclination angle of the inclined surface of the die is 15° to 25°, and an inclination angle of the inclined surface of the punch is 15° to 25°, the rolling of the overhang occurs from a position where the punch presses the plate to form the overhang when the bottom wall of the overhang separates from the tip end surface of the punch to a closed position where the die and the punch are closed, and in the closed position, the bottom wall of the overhang is separated from the tip end surface of the punch and from a flat bottom end surface of the die.

2. The producing method according to claim 1, wherein a ratio, between a distance from the inclined surface of the die to the inclined surface of the punch in, a state where the die and the punch are closed, and a plate thickness of the plate is 0.2 to 0.8.

3. The producing method according to claim 1, wherein the separator is one of a fuel-cell separator, an automotive component or a home electrical appliance component.

4. The producing method according to claim 1, wherein the state where the die and the punch are separated from the bottom wall of the overhang is maintained until the die and the punch are closed.

5. The producing method according to claim 4, wherein the die and the punch roll the sidewall of the overhang in a state where the die and the punch are separated from a portion of the plate between adjacent overhangs, and the state where the die and the punch are separated from the portion of the plate between adjacent overhangs is maintained until the die and the punch are closed.

6. The producing method according to claim 1, wherein the material of the plate is one of titanium, titanium alloy and stainless steel.

* * * * *